(12) United States Patent
Uemori et al.

(10) Patent No.: US 11,263,466 B2
(45) Date of Patent: Mar. 1, 2022

(54) FEATURE AMOUNT GENERATION DEVICE, FEATURE AMOUNT GENERATING METHOD, AND INFORMATION PROCESSING APPARATUS AND INFORMATION PROCESSING METHOD

(71) Applicant: SONY CORPORATION, Tokyo (JP)

(72) Inventors: Takeshi Uemori, Tokyo (JP); Atsushi Ito, Kanagawa (JP); Shinichiro Gomi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 16/639,333

(22) PCT Filed: Jun. 18, 2018

(86) PCT No.: PCT/JP2018/023112
§ 371 (c)(1),
(2) Date: Feb. 14, 2020

(87) PCT Pub. No.: WO2019/039059
PCT Pub. Date: Feb. 28, 2019

(65) Prior Publication Data
US 2020/0250452 A1 Aug. 6, 2020

(30) Foreign Application Priority Data

Aug. 22, 2017 (JP) .................................. 2017-159177

(51) Int. Cl.
*G06K 9/00* (2006.01)
*G06K 9/20* (2006.01)
*G06K 9/46* (2006.01)

(52) U.S. Cl.
CPC ......... *G06K 9/2018* (2013.01); *G06K 9/2054* (2013.01); *G06K 9/4652* (2013.01); *G06K 9/4661* (2013.01); *G06K 9/00375* (2013.01)

(58) Field of Classification Search
CPC .. G06K 9/2018; G06K 9/2054; G06K 9/4652; G06K 9/4661; G06K 9/00375;
(Continued)

(56) References Cited

U.S. PATENT DOCUMENTS 5,836,872 A * 11/1998 Kenet .................... G06T 7/136
600/306
10,113,910 B2 * 10/2018 Brunk .................. G01J 3/2803
(Continued)

*Primary Examiner* — Ali Bayat
(74) *Attorney, Agent, or Firm* — Paratus Law Group, PLLC

(57) ABSTRACT

A feature amount generation unit 26a of an information processing unit 20-1 generates a feature amount indicating the relationship in spectral reflectance between two points, from spectral data of a multispectral image in an irradiation region of a common light source acquired by a multispectral camera 10. A recognition processing unit 27 performs recognition processing on a subject, on the basis of the feature amount generated by the feature amount generation unit 26a, with at least one of the two points regarded as a position in an image area of the subject that is a recognition target in the multispectral image. Therefore, the feature amount generation unit 26a can easily generate the feature amount robust against variation of the light source and appropriate for the subject. In addition, the authentication processing unit 27 can accurately perform the recognition processing even if the light source varies between registration of the subject and the recognition of the subject.

15 Claims, 12 Drawing Sheets

(58) Field of Classification Search
CPC ...... G06K 9/00362; G06T 2207/10024; G06T 7/90; G06T 7/11; G06T 7/00
USPC ........................................................ 382/103
See application file for complete search history.

(56) References Cited

U.S. PATENT DOCUMENTS

| | | | |
|---|---|---|---|
| 2002/0071605 A1* | 6/2002 | Iida | G06T 1/0007 382/165 |
| 2004/0017586 A1* | 1/2004 | Nichogi | H04N 1/6005 358/2.1 |
| 2004/0240712 A1* | 12/2004 | Rowe | A61B 5/14546 382/124 |
| 2010/0208951 A1* | 8/2010 | Williams | G06K 9/2018 382/117 |
| 2015/0145884 A1* | 5/2015 | Jang | G01J 3/462 345/603 |

* cited by examiner

FEATURE AMOUNT GENERATION DEVICE, FEATURE AMOUNT GENERATING METHOD, AND INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2018/023112 (filed on Jun. 18, 2018) under 35 U.S.C. § 371, which claims priority to Japanese Patent Application No. 2017-159177 (filed on Aug. 22, 2017), which are all hereby incorporated by reference in their entirety.

TECHNICAL FIELD

This technology relates to a feature amount generation device and a feature amount generating method, and an information processing apparatus and an information processing method, in which a feature amount robust against variation of a light source is generated.

BACKGROUND ART

Conventionally, recognition of a subject has been performed with the color of the subject. For example, in Patent Document 1, light source information as spectral distribution information regarding a light source is acquired, color feature amount information independent from a light source environment is calculated on the basis of the light source information, and the presence of a desired subject is determined with the calculated color feature amount information. In addition, the light source information is acquired by capturing a subject having a known spectral reflectance, or by collating with a database indicating the correspondence between color distribution information regarding a specific area of an image and the spectral distribution information of the light source. Furthermore, in Patent Document 2, a difference image between an image captured with a probe light source lit up and an image captured without the probe light source lit up is generated to acquire light source information from the difference image.

CITATION LIST

Patent Document

Patent Document 1: Japanese Patent Application Laid-Open No. 2008-236437
Patent Document 2: Japanese Patent Application Laid-Open No. 2001-83009

SUMMARY OF THE INVENTION

Problems to be Solved by the Invention

Meanwhile, in Patent Document 1, processing of acquiring light source information is necessary in order to calculate color feature amount information.

Therefore, an object, of this technology is to provide a feature amount generation device and a feature amount generating method that are easily capable of generating a feature amount robust against variation of a light source and appropriate for a subject, without acquisition of light source information, and an information processing apparatus and information processing method that uses the generated feature amount.

Solutions to Problems

The first aspect of this technology is in a feature amount generation device including: a feature amount generation unit configured to generate, from spectral data of a multispectral image, a feature amount indicating a relationship in spectral reflectance between two points in an irradiation region of a common light source.

In this technology, with data of the two points in the irradiation region of the common light source, a log-difference geometric mean chromaticity (LDGMC) value is generated as the feature amount indicating the relationship in spectral reflectance between the two points, from the spectral data of the multispectral image. At least one of the two points is regarded as a position in an image area of a subject that is a target for generating the feature amount. In addition, the two points are regarded, for example, as different positions identical in time. Furthermore, when at least one of the two points is a point on a dynamic subject, the feature amount is generated with the two points regarded as different positions identical in time, and when both of the two points are points on a stationary subject, the feature amount is generated with the two points regarded as identical positions different in time.

The second aspect of this technology is in
a feature amount generating method including: generating, from spectral data of a multispectral image, a feature amount indicating a relationship in spectral reflectance between two points in an irradiation region of a common light source.

The third aspect of this technology is in
an information processing apparatus including:
a feature amount generation unit configured to generate, from spectral data of a multispectral image, a feature amount indicating a relationship in spectral reflectance between two points in an irradiation region of a common light source; and
a recognition processing unit configured to perform, with at least one of the two points regarded as a position in an image area of a subject that is a recognition target in the multispectral image, recognition processing on the subject, on the basis of the feature amount generated at the feature amount generation unit.

In this technology, a log-difference geometric mean chromaticity (LDGMC) value is generated at the feature amount generation unit, from the spectral data of the multispectral image, as the feature amount indicating the relationship in spectral reflectance between the two points in the irradiation region of the common light source. For example, the multispectral image is a captured image including a skin area, and the two points are regarded as points in the skin area, or one of the two points is regarded as a point in the skin area and the other point is regarded as a point in a non-skin area different from the skin area. In addition, the recognition processing unit performs collation between authentication information and registration authentication information registered in advance, the authentication information being obtained through machine learning performed with the feature amount for each band generated at the feature amount generation unit, and outputs a recognition result of the subject that is the recognition target, on the basis of the result of the collation.

Furthermore, provided is a dynamic area detection unit that detects a dynamic area, with the spectral data, and the feature amount generation unit generates the feature amount indicating the relationship in spectral reflectance between the two points that are positions based on the result of the detection at the dynamic area detection unit. For example, when the feature amount generation unit discriminates that the subject has been moved, on the basis of the result of the detection at the dynamic area detection unit, the feature amount generation unit generates the feature amount, with the two points regarded as different positions in the image area of the subject identical in time. Furthermore, when the feature amount generation unit discriminates that the subject has not been moved, the feature amount generation unit generates the feature amount, with the two points further regarded as identical positions in the image area different in time.

Furthermore, provided are an area detection unit that detects a subject area, with the spectral data, and an irradiation light control unit that performs irradiation light control of the light source, in accordance with the result of the detection at the area detection unit. The irradiation light control unit causes the light source to irradiate, with irradiation light having a spectral distribution set in advance, the subject that is the recognition target detected at the area detection unit.

The fourth aspect of this technology is in
an information processing method including:
generating, from spectral data of a multispectral image, a feature amount indicating a relationship in spectral reflectance between two points in an irradiation region of a common light source; and
performing, with at least one of the two points regarded as a position in an image area of a subject that is a recognition target in the multispectral image, recognition processing on the subject, on the basis of the feature amount generated at the feature amount generation unit.

Effects of the Invention

According to this technology, a feature amount indicating the relationship in spectral reflectance between two points in an irradiation region of the common light source is generated from spectral data of a multispectral image. Thus, without acquisition of light source information, the feature amount robust against variation of the light source and appropriate for the subject can be generated easily. Note that the effects described in the present specification are merely exemplified and are not intended to be limiting, and additional effects may be made.

MODE FOR CARRYING OUT THE INVENTION

Figure 1:
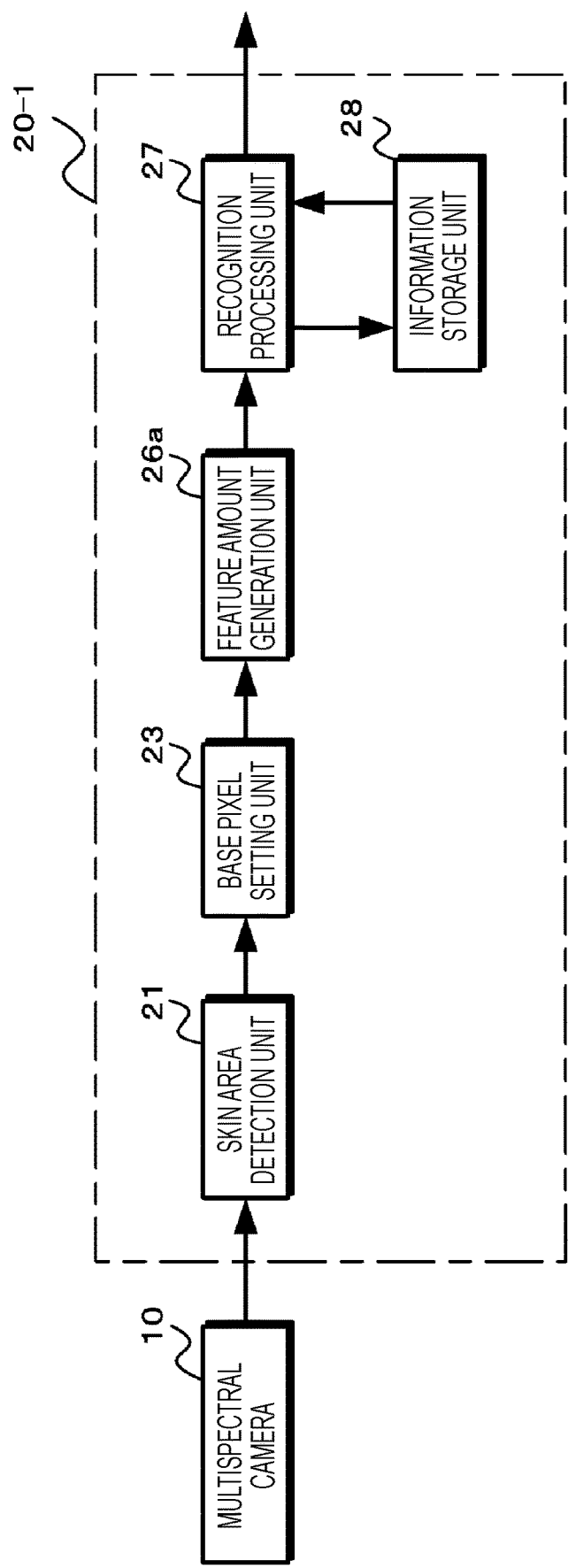
FIG. 1 is a diagram of the configuration of a first embodiment.

Hereinafter, embodiments for carrying out the present technology will be described. Note that the description will be given in the following order.
 1. First Embodiment
 2. Second Embodiment
 3. Third Embodiment
 4. Fourth Embodiment
 5. Fifth Embodiment
 6. Modifications 1. First Embodiment FIG. 1 exemplifies the configuration of a first embodiment. A multispectral camera 10 outputs image data of a multispectral image obtained by capturing an object such as skin under a common light source, to an information processing unit 20-1. Note that the image data of the multispectral image in the present technology is spectral data for each band (wavelength range, color channel) obtained by spectrally split into several bands to several tens of bands or more.

The information processing unit 20-1 generates a feature amount indicating the relationship in spectral reflectance between two points in an irradiation region of the common light source, the irradiation area being an area in which a spectral distribution of irradiation light is uniform, from the spectral data of the multispectral image (image data) obtained by the multispectral camera 10. The information processing unit 20-1 generates the feature amount, with at least one of the two points regarded as a position in an image area of a subject that is a target for generating the feature amount, namely, in a skin area. In addition, the information processing unit 20-1 performs recognition processing on the captured skin, on the basis of the generated feature amount.

The information processing unit 20-1 includes, for example, a skin area detection unit 21, a base pixel setting unit 23, a feature amount generation unit 26*a*, a recognition processing unit 27, and an information storage unit 28.

The skin area detection unit 21 discriminates whether each pixel is a pixel of a skin image on the basis of the spectral data, and generates a skin area map indicating an area of the skin image. The discrimination whether or not the pixel is a pixel of the skin image is performed on the basis of the comparison result between a color component and a threshold after conversion of the spectral data into hue saturation value (HSV) space, YCrCb color space, YIQ color space, or the like. In addition, in a case where the multispectral camera 10 is fixed and the spectral data is moving image data obtained by capturing a skin-color subject having been moved, an image area excluding a background portion that has not been moved may be detected as a skin-color area. Note that the skin area detection unit 21 is not limited to these methods, and may detect with a combination of these methods, or may detect the skin area with a different method. The skin area detection unit 21 outputs the generated skin area map to the base pixel setting unit 23.

The base pixel setting unit 23 sets, as a base pixel, one point in the generation of a feature amount indicating the relationship in spectral reflectance between the two points. The base pixel setting unit 23 sets a pixel area including one pixel or a plurality of pixels as the base pixel. For example, the base pixel setting unit 23 sets, as a base pixel, a pixel at a specific position in the skin area indicated by the skin area map. Alternatively, the base pixel setting unit 23 may set, as a base pixel, the entirety of the skin area indicated by the skin area map, or may set, as a base pixel, one pixel or a plurality of pixels in an area indicating a specific part or the like in the skin area indicated by the skin area map. For example, in a case where spectral data indicates a hand image, the base pixel setting unit 23 may set, as a base pixel, one pixel or a plurality of pixels indicating a nail or a finger joint. Alternatively, for example, in a case where spectral data indicates a face image, the base pixel setting unit 23 may set, as a base pixel, one pixel or a plurality of pixels on a part such the nose, a lip, or an eye. In addition, setting of the base pixel is made equally in generation of authentication information based on the feature amount and generation of registration authentication information stored in the information storage unit 28 such that authentication processing is performed accurately. Note that in a case where a plurality of pixels is set as base pixels, for example, the mean value of the plurality of pixels is used as the pixel value of the base pixel.

The feature amount generation unit 26a generates the feature amount indicating the relationship in spectral reflectance between the two different points, with spectral data of the base pixel that is the one point and spectral data of a pixel of the other point different from the base pixel (hereinafter referred to as "reference pixel").

Spectral data R acquired by the multispectral camera 10 is generally determined by the spectral distribution E of a light source, the spectral reflectance S of a subject, and the spectral sensitivity characteristic Q of the multispectral camera 10, as expressed in Expression (1). Note that, in Expression (1), "σ" represents a scaling factor, "λ" represents the wavelength of light, and "k" represents a band (color channel) of the multispectral camera 10.

[Math. 1]

$$R_k = \sigma \int E(\lambda) S(\lambda) Q_k(\lambda) d\lambda \quad (1)$$

In addition, in the non-patent document "Practical Scene Illuminant Estimation via Flash/No-Flash Pairs", Cheng Lu and Mark S. Drew Simon Fraser University, it is described that in Expression (1), the spectral sensitivity characteristic of the multispectral camera 10 is approximated with a Dirac function and the light source follows the Planck's law, so that the logarithmic value of spectral data $R_k(x)$ at a position x in spectral data of a band (color channel) k can be expressed by Expression (2). Note that, in Expression (2), "$w_k$" represents a term relating to the spectral sensitivity characteristic of the multispectral camera 10 and the wavelength of the light. "$K(x)$" represents a term relating to the luminance of the light source at the position x on an image. "$s_k(x)$" represents a term relating to the spectral reflectance characteristic of an object at the position x on the image. "$T(x)$" represents the color temperature of the light source, and "$e_k$" represents a term relating to the spectral sensitivity characteristic of the multispectral camera 10.

[Math. 2]

$$\text{Log} R_k(x) = w_k + K(x) + s_k(x) + \frac{1}{T(x)} e_k \quad (2)$$

In addition, it is described that, in order to eliminate influence of the term relating to the luminance of the light source, spectral data $R_k$ is divided by the geometric mean and switched to color space $c_k$, and the logarithmic value of color space $c_k$, that is, the log geometric mean chromaticity (LGMC) value (hereinafter, referred to as "LGMC value") $r_k$ can be calculated by Expression (3). Note that, in Expression (3), "$s_M$" represents the geometric mean calculated with the spectral reflectance characteristic of the object in each band, and "$(s_k/s_M)$" represents a term relating to the spectral reflectance characteristics of the object. In addition, "$e_H$" represents the arithmetic mean calculated with the spectral sensitivity characteristic in each band, and "$(e_k-e_M)$" represents a term relating to the spectral sensitivity characteristic of the multispectral camera 10.

[Math. 3]

$$r_k = \log(c_k) = \log\frac{s_k}{s_M} + \frac{e_k - e_M}{T} \quad (3)$$

Furthermore, the value $r_k$ represented in Expression (3) is the logarithmic value of a value obtained by dividing the spectral data $R_k$ by the geometric mean and thus, the value $r_k$ can also be expressed as Expression (4). Note that, in Expression (4), "N" represents the number of bands (the number of color channels).

[Math. 4]

$$r_k = \log\left(\frac{R_k}{\sqrt[N]{\prod_{i=1}^{N} R_i}}\right) \quad (4)$$

Here, in a case where the difference between an LGMC value $r_k(x_0)$ at a position $x_0$ and an LGMC value $r_k(x_1)$ at a position $x_1$ is calculated, and in a case where positions $x_0$ and $x_1$ are located on an image captured by the same multispectral camera 10 with the common light source, the value of "$(e_k-e_H)/T$" is equal. Therefore, the expression for calculating the difference between the LGMC value $r_k(x_0)$ and the LGMC value $r_k(x_1)$, namely, the value of log-difference geometric mean chromaticity (LDGMC) (hereinafter, referred to as "LDGMC value") $Dr_k(x_1, x_0)$ is Expression (5), and the LDGMC value $Dr_k(x_1, x_0)$ is a feature amount indicating the relationship in spectral reflectance of the object, without depending on the light source.

[Math. 5]

$$r_k(x_1) - r_k(x_0) = \log\frac{s_k(x_1)}{s_M(x_1)} - \log\frac{s_k(x_0)}{s_M(x_0)} = Dr_k(x_1, x_0) \quad (5)$$

The feature amount generation unit 26a calculates the LDGMC value $Dr_k(x_1, x_0)$ with the spectral data of the base pixel and the spectral data of the reference pixel, and regards the calculated LDGMC value $Dr_k(x_1, x_0)$ is as a feature amount indicating the relationship in spectral reflectance between the two points. Specifically, with the spectral data of each band, the LGMC value $r_k(x_0)$ at the position $x_0$ of the base pixel and the LGMC value $r_k(x_1)$ at the position $x_1$ of the reference pixel are calculated on the basis of Expression (4), and the LDGMC value indicating the difference between the LGMC value $r_k(x_0)$ and the LGMC value $r_k(x_1)$ is regarded as the feature amount.

In addition, in a case where an area including a plurality of pixels is set as a base pixel by the base pixel setting unit 23, for example, in a case where the entirety of the skin area indicated by the skin area map is set as a base pixel, the feature amount generation unit 26a calculates, on the basis of Expression (6), the arithmetic mean of all pixels included in the skin area and regards the arithmetic mean the as the spectral data $R_k(x_0)$ of the base pixel. Note that, in Expression (6), "M" represents the number of pixels included in the skin area. Spectral data $R_k(j)$ represents the pixel value of the jth pixel included in the skin area, in the spectral data of the kth band.

[Math. 6]

$$R_k(x_0) = \frac{1}{M}\sum_{x=1}^{M} R_k(x) \qquad (6)$$

The feature amount generation unit 26a sets the reference pixel in a skin area that is an area in which a spectral distribution of irradiation light is uniform in a captured image at identical in time to the base pixel and that is the target for generating the feature amount. Then, with the spectral data of the base pixel and the spectral data of the reference pixel, the feature amount generation unit 26a generates the feature amount indicating the relationship in spectral reflectance between the two points, and outputs the feature amount to the recognition processing unit 27.

On the basis of the feature amount supplied from the feature amount generation unit 26a and registration authentication information stored in the information storage unit 28, the recognition processing unit 27 performs recognition of the subject indicated by the spectral data on a pixel basis or for each area including a plurality of pixels. In the information storage unit 28, the registration authentication information is stored together with subject information. The subject information is correlated with the registration authentication information, and indicates what kind of object is the subject indicated by the registration authentication information. For example, in a case where spectral data of a person's skin image is used at the information processing unit 20-1, text information regarding full name or the like, or image information regarding a face image or the like is used as the subject information. In addition, voice information or the like may be used as the subject information.

The recognition processing unit 27 compares the authentication information based on the feature amount generated at the feature amount generation unit 26a with the registration authentication information stored in the information storage unit 28, and outputs subject information correlated with registration authentication information that matches the authentication information based on the feature amount or has the minimum deviation, within a threshold, from the authentication information based on the feature amount. The recognition processing unit 27 generates the authentication information suitable for recognition processing, on the basis of the feature amount. For example, machine learning is performed with a feature amount for each band generated by providing the reference pixel in the skin area indicated by the skin area map, and the result of the learning is used as the authentication information. The machine learning algorithm is not limited to a specific algorithm, and it is sufficient if machine learning performed with an algorithm such as neuralnet, regression, or clustering. As described above, if the result of the machine learning with the feature amount is used as the authentication information, the authentication information can be generated having less influence of, for example, noise included in spectral data or variation in pixel value (e.g., pixel value of the base pixel including a plurality of pixels) to be used for calculating a feature amount, and variation in position of the base pixel or the reference pixel. Note that the recognition processing unit 27 may use the feature amount as the authentication information. In addition, the recognition processing unit 27 may generate and output a recognition result map by correlating the subject information and a captured image, as output of the subject information. The recognition result map is generated so as to indicate, for example, a skin area in the captured image belongs to which person's skin.

As the registration authentication information stored in the information storage unit 28, the authentication information generated at the recognition processing unit 27 is used after it is processed at the skin area detection unit 21, the base pixel setting unit 23, the feature amount generation unit 26a, and the recognition processing unit 27, with, for example, spectral data obtained by the multispectral camera 10 having captured a person's skin to be registered. The information storage unit 28 stores the authentication information generated at the recognition processing unit 27 as the registration authentication information, by correlating with subject information relating to the person to be registered.

Figure 2:
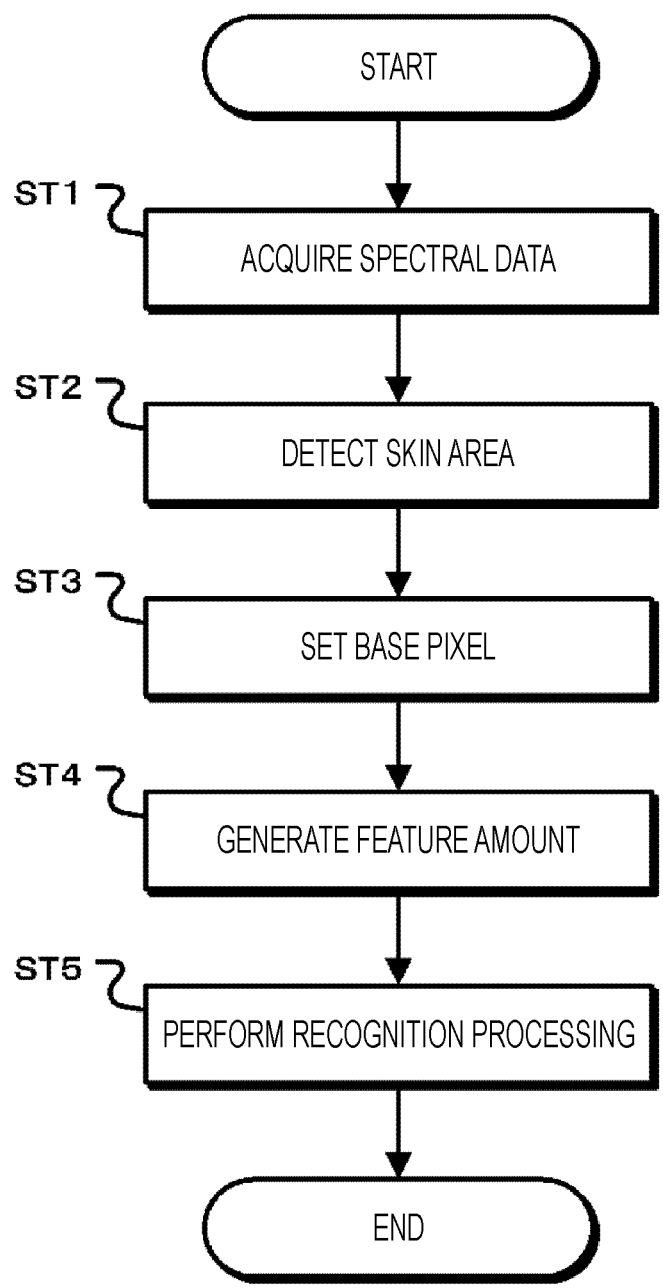
FIG. 2 is a flowchart of the operation of the first embodiment.

Next, the operation of the first embodiment of the information processing unit of will be described. FIG. 2 is a flowchart of the operation of the first embodiment. In step ST1, the information processing unit 20-1 acquires spectral data. The information processing unit 20-1 acquires spectral data generated by the multispectral camera 10 and the processing proceeds to step ST2.

Figure 3:
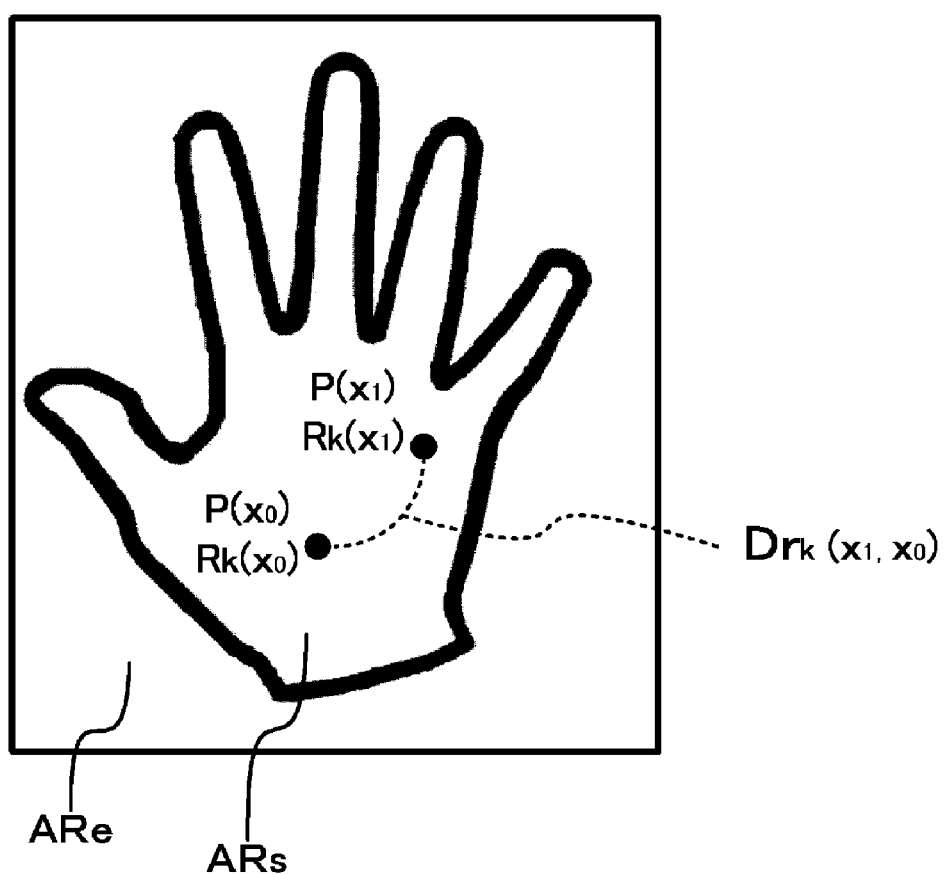
FIG. 3 exemplarily illustrates a captured image of skin.

In step ST2, the information processing unit detects a skin area. The information processing unit 20-1 discriminates whether each pixel is a pixel of a skin image on the basis of the spectral data, generates, for example, a skin area map indicating the result of the skin area detection, and the processing proceeds to step ST3. FIG. 3 exemplifies a captured image of skin, and an area ARs indicates a skin area detected by the skin area detection, and an area ARe indicates a non-skin area.

In step ST3, the information processing unit sets a base pixel. The information processing unit 20-1 sets, as the base pixel, one point in generation of a feature amount indicating the relationship in spectral reflectance between two points, for example, a fixed pixel area including one pixel or a plurality of pixels, and the processing proceeds to step ST4. Note that FIG. 3 illustrates a case where a position $P(x_0)$ is set as the base pixel.

In step ST4, the information processing unit generates the feature amount. The information processing unit 20-1 sets a reference pixel in the skin area, and, with spectral data of the reference pixel and spectral data of the base pixel that is set in step ST3, generates the feature amount indicating the relationship in spectral reflectance between the base pixel and the reference pixel. The processing then proceeds to step ST5. Note that, in FIG. 3, a different position $P(x_1)$ identical in time is set as the reference pixel, and a feature amount $Dr_k(x_1, x_0)$ is generated with spectral data $R_k(x_0)$ of the base pixel and spectral data $R_k(x_1)$ of the reference pixel, on the basis of Expressions (4), (5) described above.

In step ST5, the information processing unit performs recognition processing. The information processing unit 20-1 compares authentication information based on the feature amount generated in step ST4 with registration authentication information stored in advance, and performs recognition of a subject indicated by the spectral data, on a pixel basis or on an area basis. In addition, the information processing unit 20-1 outputs subject information correlated with registration authentication information that matches the authentication information based on the feature amount or has the minimum deviation, within a threshold, from the authentication information based on the feature amount, or outputs correlation of subject information and the captured image as the recognition result.

Note that FIG. 3 illustrates the case where the feature amount is generated with the base pixel and the one reference pixel; however, a plurality of reference pixels may be provided in a skin area, or base pixels may be set at specific positions in different skin areas to generate a feature amount. In this case, the recognition processing unit 27 generates recognition information on the basis of a feature amount generated for each base pixel and each reference pixel.

As described above, according to the first embodiment, without acquisition of light source information, the feature amount robust against variation of the light source and appropriate for the skin, namely, the feature amount relating to the spectral reflectance unique to the skin can be generated without depending on the spectral distribution of the light source. In addition, even in a case where the light source is different between registration of authentication information and recognition processing with registration authentication information and authentication information, recognition processing on, for example, a person can be performed accurately without influence of the light source.

2. Second Embodiment

Meanwhile, in the first embodiment, the case has been described in which the feature amount indicating the relationship in spectral reflectance between the two points in the same captured image, namely, at the same time, is generated. However, the two points, namely, the base pixel and the reference pixel are not limited to the case of the setting in the same captured image. Next, in a second embodiment, a case will be described in which a base pixel is set in one of captured images different in time period and a reference pixel is set in the other captured image.

Figure 4:
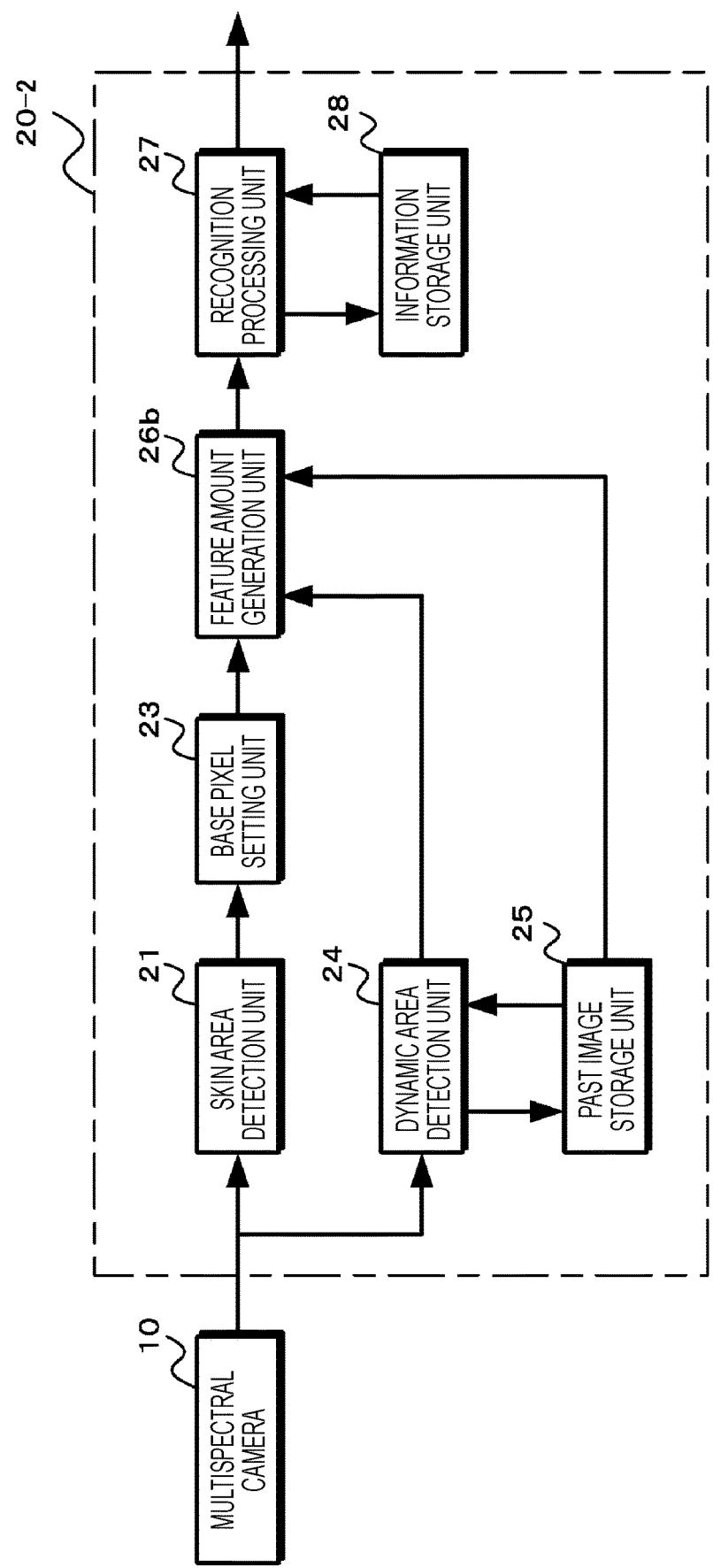
FIG. 4 is a diagram of the configuration of a second embodiment.

FIG. 4 is a diagram of the configuration of the second embodiment. The information processing unit 20-2 includes, for example, a skin area detection unit 21, a base pixel setting unit 23, a dynamic area detection unit 24, a past image storage unit 25, a feature amount generation unit 26b, a recognition processing unit 27, and an information storage unit 28.

The skin area detection unit 21 discriminates whether each pixel is a pixel of a skin image, on the basis of spectral data acquired by a multispectral camera 10, and generates a skin area map indicating an area of the skin image as described above. The skin area detection unit 21 outputs the generated skin area map to the base pixel setting unit 23.

The base pixel setting unit 23 sets, as a base pixel, one point in generation of a feature amount indicating the relationship in spectral reflectance between two points. The base pixel setting unit 23 sets, as the base pixel, a fixed pixel area including one pixel or a plurality of pixels.

The dynamic area detection unit 24 stores the spectral data acquired by the multispectral camera 10 in the past image storage unit 25. In addition, the dynamic area detection unit 24 discriminates a dynamic area, with the spectral data acquired by the multispectral camera 10 (also referred to as "spectral data of a current image"), and spectral data of a past image stored in the past image storage unit 25. For example, the dynamic area detection unit 24 calculates a difference value for each pixel position between the current image and the past image, determines, as a pixel of the dynamic area, a pixel having a difference value exceeding a threshold and, as a pixel of a static area, a pixel having a difference value that is the threshold or less, and generates a dynamic area map on the basis of the determination result to output the dynamic area map to the feature amount generation unit 26b.

The feature amount generation unit 26b generates a feature amount indicating the relationship in spectral reflectance between the base pixel and the reference pixel. When at least one of the two points is a point on a dynamic subject, the feature amount generation unit 26b generates a feature amount, with the two points regarded as different positions identical in time. In addition, when both of the two points are points on a stationary subject, the feature amount generation unit 26b generates a feature amount, with the two points regarded as different positions identical in time, and generates a feature amount, with the two points further regarded as identical positions different in time. That is, the feature amount generation unit 26b compares the skin area map indicating the result the detection at the skin area detection unit 21 with the dynamic area map indicating the result of the detection at the dynamic area detection unit 24, and, in the case where the skin area is the dynamic area, the feature amount generation unit 26b sets the base pixel and the reference pixel in the current image, similarly to the first embodiment. In addition, in a case where the skin area is not the dynamic area, the feature amount generation unit 26b not only sets the base pixel and the reference pixel in the current image but also sets, in the past image, the reference pixel at a position equal to the position of the base pixel of the current image. The feature amount generation unit 26b generates a feature amount, with spectral data of the base pixel and spectral data of the reference pixel in the spectral data of the current image, or with the spectral data of the base pixel and the spectral data of the reference pixel in the spectral data of the current image and spectral data of the reference pixel in the spectral data of the past image stored in the past image storage unit 25.

The recognition processing unit 27 compares authentication information based on the feature amount generated at the feature amount generation unit 26b, with registration authentication information stored in the information storage unit 28, and outputs subject information correlated with registration authentication information that matches the authentication information based on the feature amount or has the minimum deviation, within a threshold, from the authentication information based on the feature amount. The recognition processing unit 27 compares, for the static area, the feature amount generated by setting the reference pixel in the past image and the authentication information based on the feature amount generated by setting the reference pixel in the current image, with the registration authentication information stored in the information storage unit 28. In addition, the recognition processing unit 27 compares, for the dynamic area, the authentication information based on the feature amount generated by setting the reference pixel in the current image, with the registration authentication information stored in the information storage unit 28. The recognition processing unit 27 outputs the subject information correlated with the registration authentication information that matches the authentication information based on the feature amount or has the minimum deviation, within the threshold, from the authentication information based on the feature amount.

Figure 5:
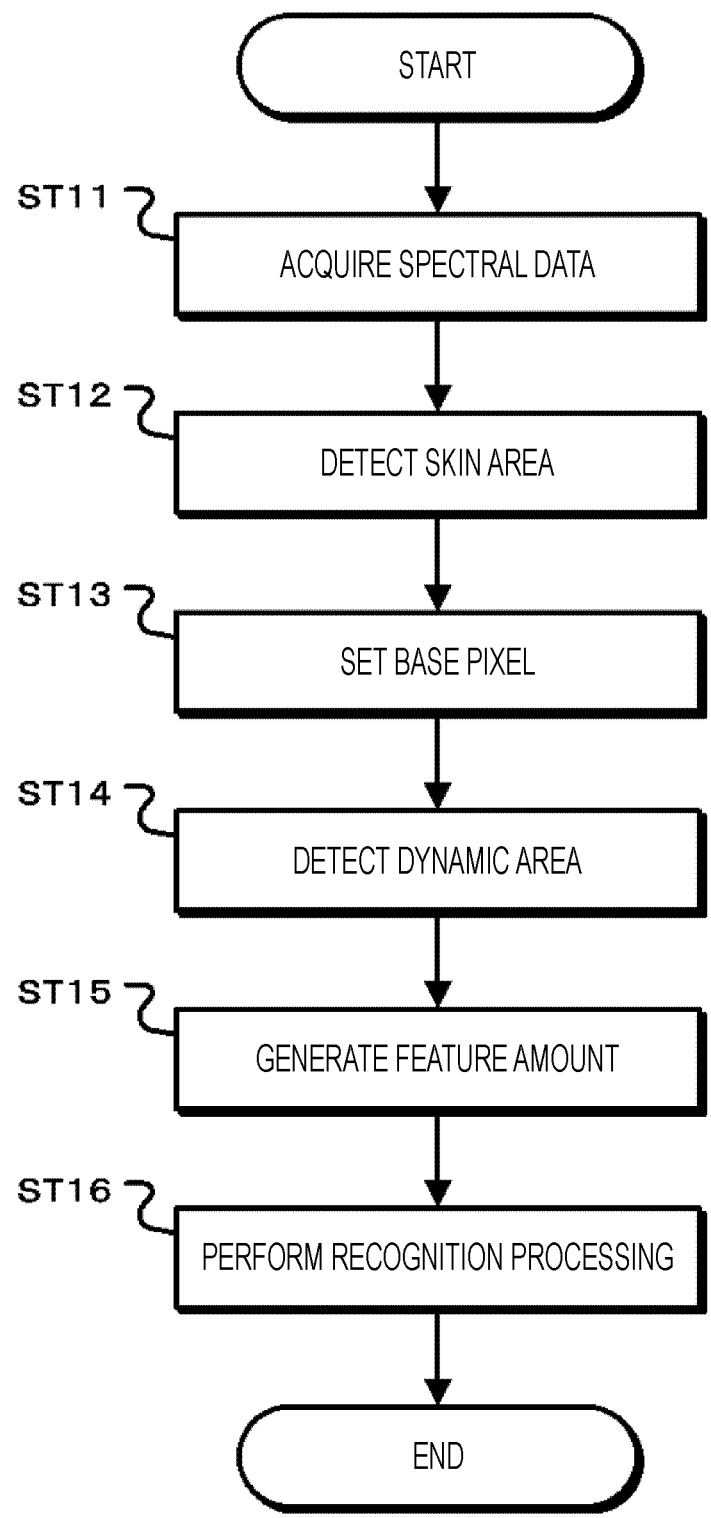
FIG. 5 is a flowchart of the operation of the second embodiment.

Next, the operation of the second embodiment in the information processing unit will be described. FIG. 5 is a flowchart of the operation of the second embodiment. In step ST11, the information processing unit 20-2 acquires spectral data. The information processing unit 20-2 acquires spectral data generated by the multispectral camera 10 and the processing proceeds to step ST12.

Figure 6:
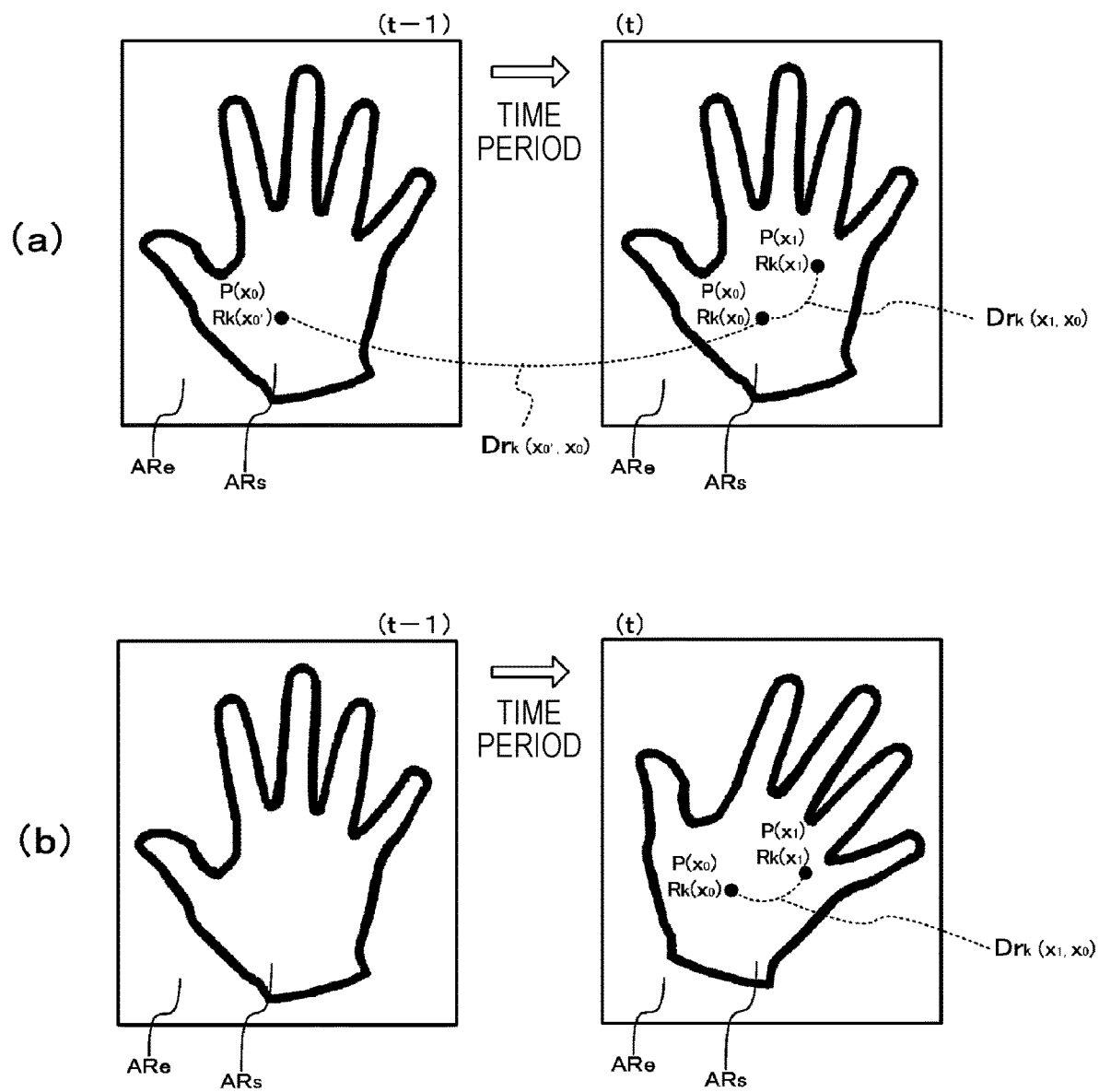
FIG. 6 exemplarily illustrates captured images between which skin has been moved.

In step ST12, the information processing unit detects a skin area. The information processing unit 20-2 discriminates whether each pixel is a pixel of a skin image on the basis of the spectral data, generates, for example, a skin area map indicating the result of the skin area detection, and the processing proceeds to step ST13. FIG. 6 exemplarily illustrates captured images between which skin has been moved. Here, each captured image at a time point (t) is defined as the current image, and each captured image at a time point (t−1) before the time point (t) is defined as the past image. (a) of FIG. 6 illustrates a case where the skin area has no movement, (b) of FIG. 6 illustrates a case where the skin area has been moved, and each skin area map indicates an area ARs is the skin area, and an area ARe is a non-skin area.

In step ST13, the information processing unit sets a base pixel. The information processing unit 20-2 sets, as the base pixel, one point in generation of a feature amount indicating the relationship in spectral reflectance between two points, for example, a fixed pixel area including one pixel or a plurality of pixels, and the processing proceeds to step ST14. Note that FIG. 6 illustrates a case where a position $P(x_0)$ is set as the base pixel.

In step ST14, the information processing unit detects a dynamic area. The information processing unit 20-2 discriminates, on the basis of the spectral data, whether each pixel is a pixel of the dynamic area, and the processing proceeds to step ST15. Note that (a) of FIG. 6 illustrates that the skin area has not been moved and thus the areas ARs, ARe are both static areas, and (b) of FIG. 6 illustrates that the skin area has been moved and thus the area ARs is detected as the dynamic area.

In step ST15, the information processing unit generates the feature amount. The information processing unit 20-2 sets a reference pixel in the skin area, and generates, with spectral data of the reference pixel and spectral data of the base pixel that is set in step ST13, the feature amount indicating the relationship in spectral reflectance between the base pixel and the reference pixel. In addition, in a case where the skin area has no movement, a position equal to the base pixel, in the past image is further set as a reference pixel to generate a feature amount, and the processing proceeds to step ST16.

For example, as illustrated in (a) of FIG. 6, in the case where the skin area has no movement, a feature amount $Dr_k(x_1, x_0)$ is generated on the basis of Expressions (4), (5) described above, with spectral data $R_k(x_0)$ of the base pixel at the position $P(x_0)$ in the current image and spectral data $R_k(x_1)$ of the reference pixel that is set at a position $P(x_1)$ of the current image. In addition, a feature amount $Dr_k(x_0', x_0)$ is generated on the basis of Expressions (4), (5) described above, with the spectral data $R_k(x_0)$ of the base pixel at the position $P(x_0)$ in the current image and spectral data $R_k(x_0')$ of the reference pixel set at a position $P(x_0)$ of the past image.

As illustrated in (a) of FIG. 6, the skin area has no change of movement in appearance; however, biometric information (e.g., pulse or respiration) has varied in time period, and thus spectral data obtained by the multispectral camera 10 makes a variance. Therefore, the feature amount $Dr_k(x_0', x_0)$ is information depending on the variation in temporal direction unique to the user. In addition, as illustrated in (b) of FIG. 6, in the case where the skin area is the dynamic area, the position of the base pixel of the current image is different from the position of the base pixel of the past image. Therefore, in a case where the skin area is a dynamic area, a feature amount unique to the user is generated by setting a reference pixel in the skin area in the current image, similarly to the first embodiment.

In step ST16, the information processing unit performs recognition processing. The information processing unit 20-2 compares authentication information based on the feature amount generated in step ST15 with registration authentication information stored in advance, and performs recognition of a subject indicated by the spectral data, on a pixel basis or on an area basis. In addition, the information processing unit 20-2 outputs subject information correlated with registration authentication information that matches the authentication information based on the feature amount or has the minimum deviation, within a threshold, from the authentication information based on the feature amount, or outputs correlation of subject information and the captured image as the recognition result.

As described above, according to the second embodiment, not only the operation effects of the first embodiment can be obtained, but also, in a case where a skin area is a static area, recognition processing on a person, or the like can be performed with user-unique information relating to, for example, the vital signs of the living body as well as a skin state, in addition to use of a feature amount between base pixels different in time.

3. Third Embodiment

Next, a third embodiment will be described. In the first and second embodiments described above, skin is the recognition target; however, in the third embodiment, a case where a general object is a recognition target will be described.

Figure 7:
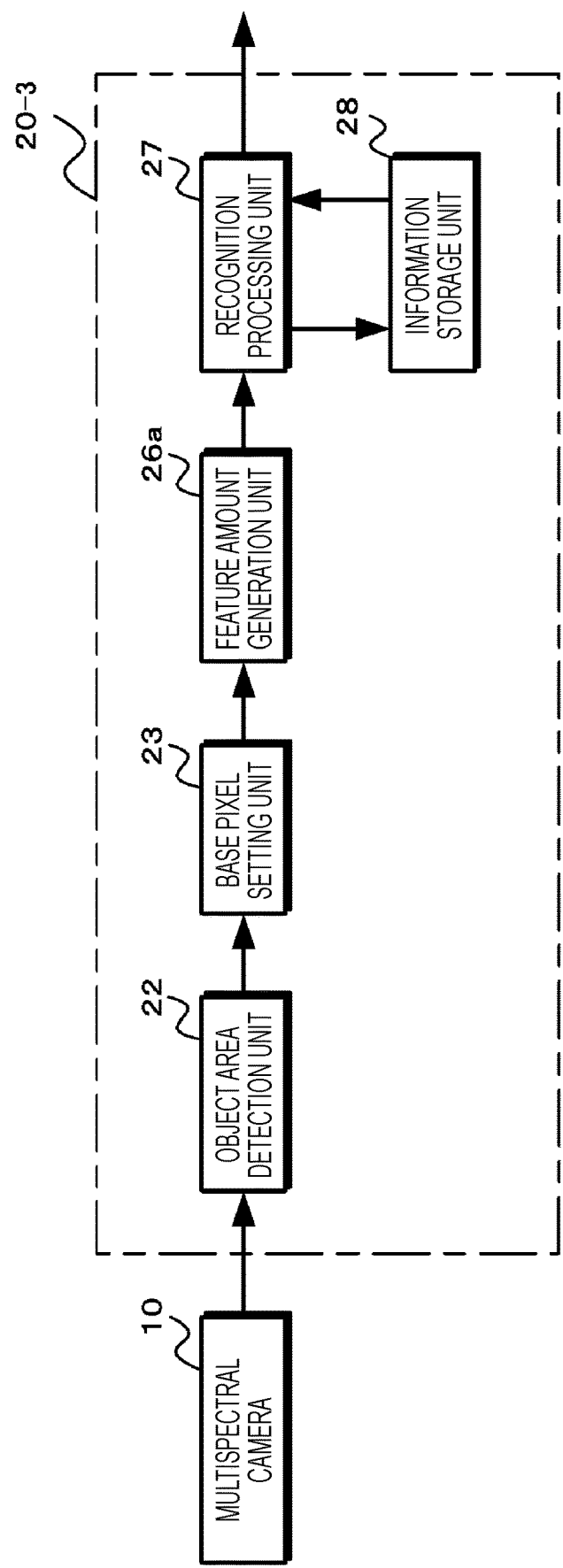
FIG. 7 is a diagram of the configuration of a third embodiment.

FIG. 7 is a diagram of the configuration of the third embodiment. An information processing unit 20-3 includes, for example, an object area detection unit 22, a base pixel setting unit 23, a feature amount generation unit 26a, a recognition processing unit 27, and an information storage unit 28.

The object area detection unit 22 performs classification for each pixel, with an object determination condition set in advance to spectral data acquired by a multispectral camera 10, and generates an object area map. For example, in a case where a recognition target is a fruit such as an orange or an apple, an object determination criterion based on, for example, the type of the fruit is used to determine, for each pixel, that the recognition target corresponds to an image of which fruit, and an object area map indicating an area for each object is generated. The object area detection unit 22 outputs the generated object area map to the base pixel setting unit 23.

The base pixel setting unit 23 sets, as a base pixel, one point in generation of a feature amount indicating the relationship in spectral reflectance between two points. The base pixel setting unit 23 sets, as the base pixel, a fixed pixel area including one pixel or a plurality of pixels in an area of the object that is a recognition target, on the basis of the object area map.

The feature amount generation unit 26a generates the feature amount indicating the relationship in spectral reflectance between the base pixel and a reference pixel. The feature amount generation unit 26a sets a reference pixel the area of the object that is the recognition target on the basis of the object area map indicating the result of the detection at the object area detection unit 22, and generates the feature amount with spectral data of the base pixel and spectral data of the reference pixel.

The recognition processing unit 27 compares authentication information based on the feature amount generated at the feature amount generation unit 26a with registration authentication information stored in the information storage unit 28, and outputs subject information correlated with registration authentication information that matches the authentication information based on the feature amount or has the minimum deviation, within a threshold, from the authentication information based on the feature amount, namely the recognition result of the object. For example, the recognition processing unit 27 compares the authentication information based on the feature amount generated at the feature amount generation unit 26a with registration authentication information regarding, for example, the variety or the place of production of fruit, stored in advance, and outputs as to any variety, any place of production, or the like, as the recognition result.

As the registration authentication information stored in the information storage unit 28, authentication information generated at the recognition processing unit 27 is used after it is processed at the object area detection unit 22, the base pixel setting unit 23, the feature amount generation unit 26a, and the recognition processing unit 27, with, for example, spectral data obtained by the multispectral camera 10 having captured an object to be registered. The information storage unit 28 stores the authentication information generated at the recognition processing unit 27 as the registration authentication information, by correlating with subject information relating to the object to be registered.

In addition, in the object recognition processing, recognition is not limited to, for example, the variety of fruit, and freshness or the like may be recognized. For example, regarding the freshness of meat, it is known that denaturation of chromoprotein has influence on the spectral reflectance. Therefore, storing registration authentication information for each freshness class in the information storage unit 28 enables discrimination of the freshness of an object at the recognition processing unit 27.

As described above, according to the third embodiment, without acquisition of light source information, the feature amount robust against variation of the light source and appropriate for the object, namely, the feature amount relating to the spectral reflectance of the object can be generated without depending on the spectral distribution of the light source. Moreover, even in a case where the light source is different between registration of authentication information and recognition processing with registration authentication information and authentication information, recognition processing on, for example, a general object can be performed accurately without influence of the light source.

4. Fourth Embodiment

Next, a fourth embodiment will be described. In the first to third embodiments described above, the base pixel is set in the image area that is the recognition target; however, the base pixel may be set in a background area different from the image area that is the recognition target.

In spectral data acquired by capturing an image with the multispectral camera 10 fixed, the image is identical in background located behind a recognition target. Therefore, at the feature amount generation unit 26a (26b) of the information processing unit and, for example, at the setting of the base pixel in, for example, step ST3 in FIG. 2, the base pixel is set in the background area, for example, the non-skin area ARe in FIG. 3. In this case, because the spectral data of the base pixel is stable, the feature amount appropriate for the recognition target can be generated stably with less variation or the like, with the image value of the base pixel set in the background area and the image value of the reference pixel set in the image area of the recognition target.

5. Fifth Embodiment

Next, as a fifth embodiment, a case where irradiation light control is performed during capturing an image will be described. In a case where a feature amount is generated, if the light source is different between two points, the term of the color temperature T of the light source remains in Expressions (3) and (5), and thus the influence of spectral distribution characteristics of the light source cannot be excluded. Thus, it is necessary that a base pixel and a reference pixel to be used for calculating the feature amount, for example, have been irradiated with light from the common light source such that the spectral distribution of the light source is uniform. Therefore, an information processing unit irradiates a skin area with light, for example, enabling accurate recognition processing on a skin area. In addition, the information processing unit irradiates a non-skin area with light having no relation to the generation of the feature amount, for example, projection light of various types of information.

Figure 8:
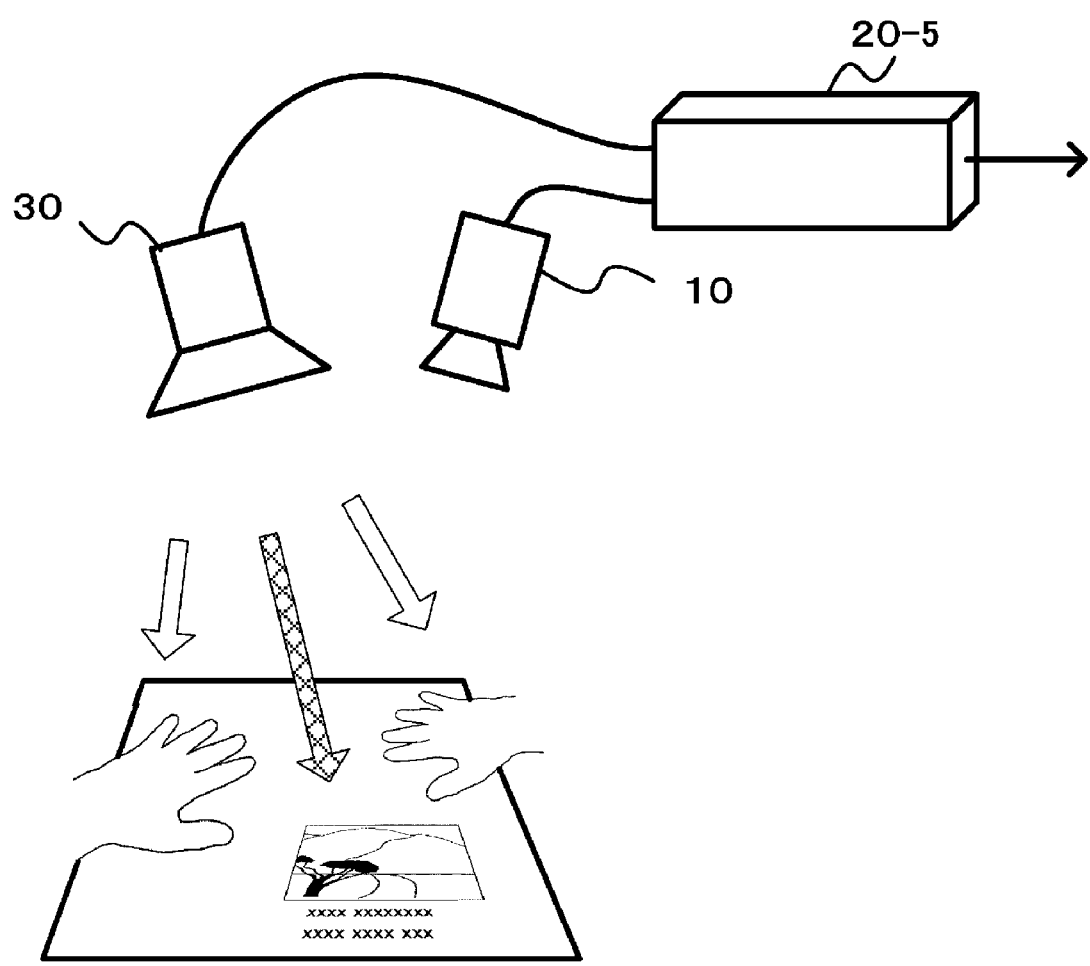
FIG. 8 exemplarily illustrates a disposition of a multispectral camera, an information processing unit, and a light source unit.

FIG. 8 exemplarily illustrates a disposition of a multispectral camera, an information processing unit, and a light source unit. A multispectral camera 10 outputs spectral data obtained by capturing a subject to an information processing unit 20-5. The information processing unit 20-5 discriminates, for example, a skin area on the basis of the spectral data, irradiates the skin area with light from a light source unit 30, the light enabling accurate recognition processing on the skin area, and irradiates a non-skin area with light from the light source unit 30, the light having no relation to the recognition processing on the recognition target, for example, projection light of various types of information.

Figure 9:
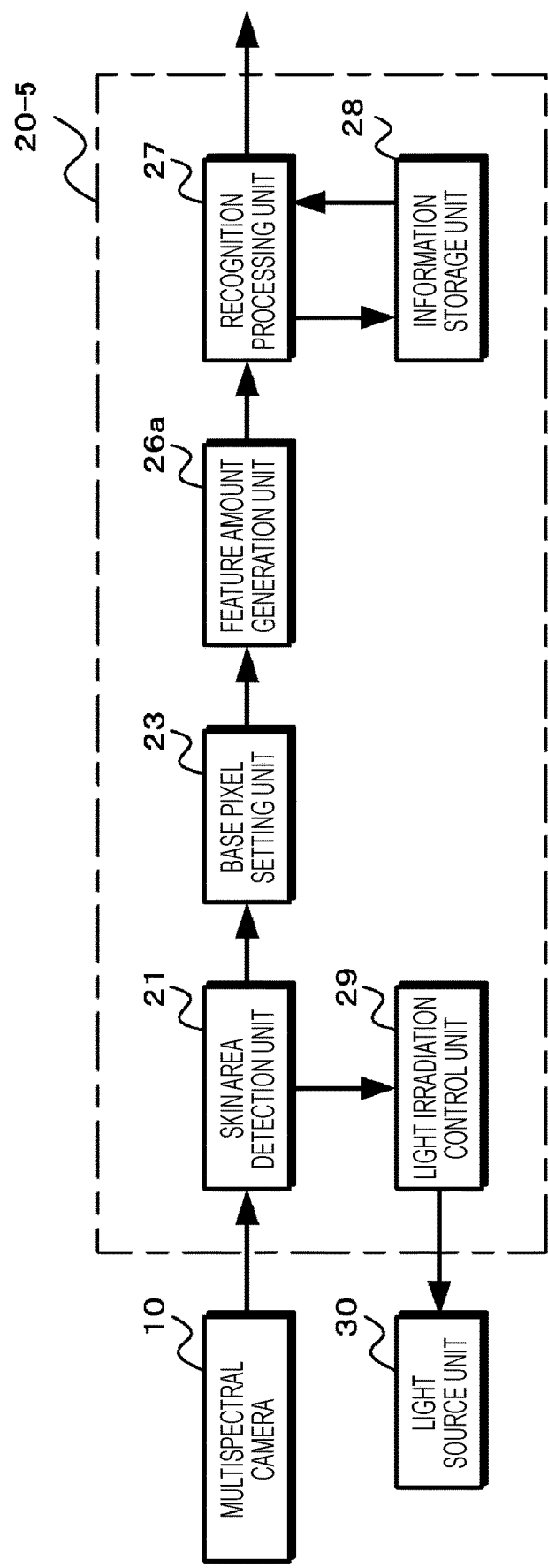
FIG. 9 is a diagram of the configuration of a fifth embodiment.

FIG. 9 illustrates the configuration of the fifth embodiment. The information processing unit 20-5 includes, for example, a skin area detection unit 21, a base pixel setting unit 23, a feature amount generation unit 26a, a recognition processing unit 27, an information storage unit 28, and a light irradiation control unit 29.

The skin area detection unit 21 discriminates whether each pixel is a pixel of a skin image on the basis of spectral data acquired by the multispectral camera 10, generates a skin area map indicating an area of the skin image, and outputs the skin area map to the base pixel setting unit 23, as described above.

The base pixel setting unit 23 sets, as a base pixel, one point in generation of a feature amount indicating the relationship in spectral reflectance between two points. The base pixel setting unit 23 sets, as the base pixel, a fixed pixel area including one pixel or a plurality of pixels.

The feature amount generation unit 26a generates the feature amount indicating the relationship in spectral reflectance between the base pixel and a reference pixel. The feature amount generation unit 26a sets the reference pixel in the skin area on the basis of the skin area map indicating the result of the detection at the skin area detection unit 21, and generates the feature amount with spectral data of the base pixel and spectral data of the reference pixel.

The recognition processing unit 27 compares authentication information based on the feature amount generated at the feature amount generation unit 26a with registration authentication information stored in the information storage unit 28, and outputs subject information correlated with registration authentication information that matches the authentication information based on the feature amount or has the minimum deviation within a threshold with the authentication information based on the feature amount.

The light irradiation control unit 29 causes the light source to irradiate, with irradiation light having a spectral distribution set in advance, the subject that is a recognition target detected at the area detection unit. The light irradiation control unit 29 performs control of the irradiation light output from the light source unit 30, on the basis of the skin area map that is the result of the skin area detection at the skin area detection unit 21. In the control of the irradiation light, the skin area is irradiated with light suitable for the recognition processing, and a non-skin area is irradiated with light, for example, projection light having no relation to the recognition processing. In addition, the light irradiation control unit 29 may emit, from the light source unit 30, light suitable for the recognition processing to obtain the result of the skin area detection, and then the non-skin area may be irradiated with light different from the light with which the skin area has been irradiated.

Figure 10:
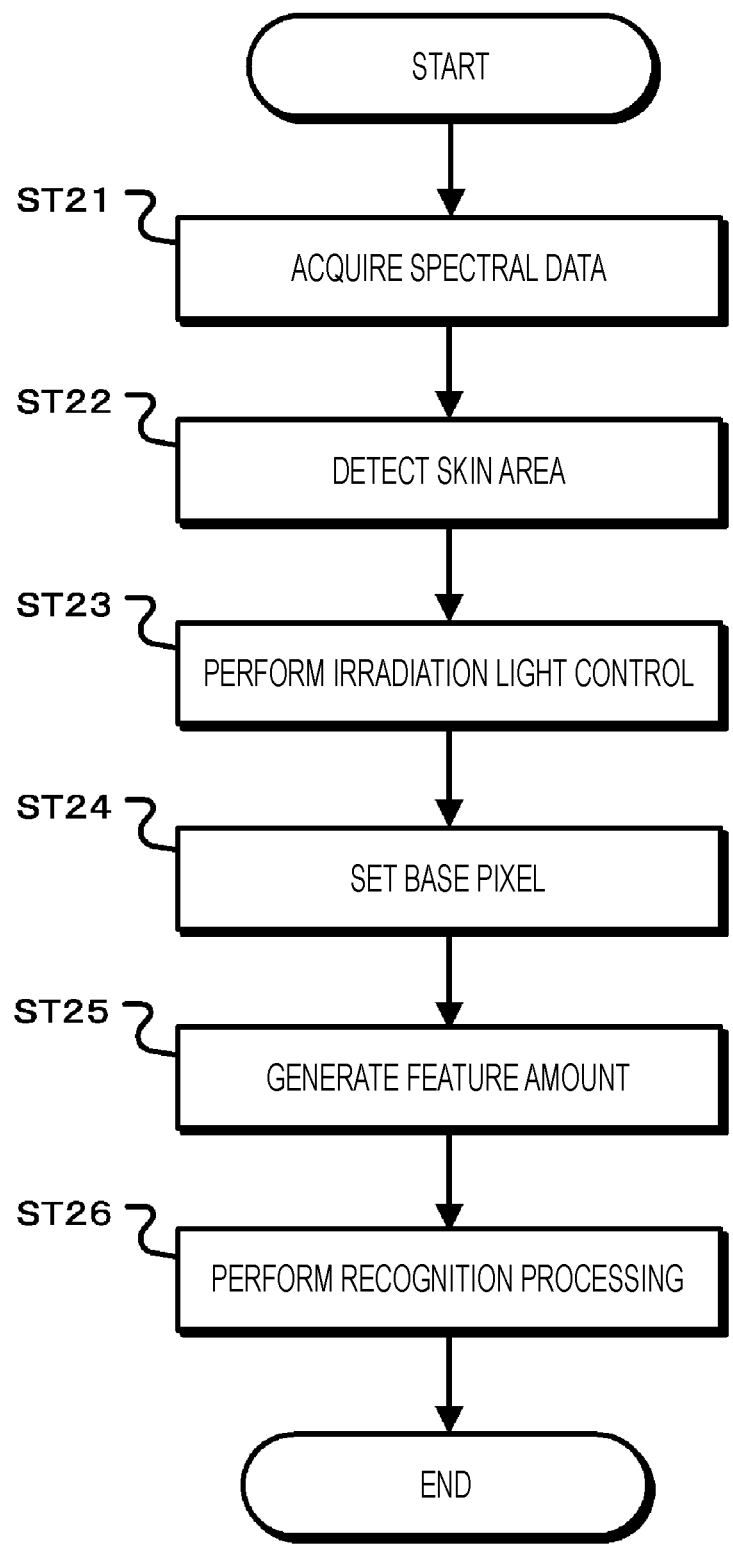
FIG. 10 is a flowchart of the operation of the fifth embodiment.

Next, the operation of the fifth embodiment in the information processing unit will be described. FIG. 10 is a flowchart of the operation of the fifth embodiment. Note that, in the operation illustrated in FIG. 10, a case is exemplified in which in a case where light suitable for the recognition processing is emitted from the light source unit 30 to obtain the result of the skin area detection, light having no relation to the generation of the feature amount, for example, projection light such as an image or text information is emitted to the non-skin area.

Here, the irradiation light suitable for the recognition processing will be described. The spectral data obtained by the multispectral camera 10 is determined in accordance with the spectral distribution of a light source, the spectral reflectance of a subject, and the spectral sensitivity characteristic of the multispectral camera, as expressed in Expression (1). Thus, in order to obtain spectral data suitable for the recognition processing, the spectral distribution of the light source needs to include the wavelength component. For example, it is assumed that illumination light suitable for generating a feature amount is at near a wavelength $\lambda i$. In addition, it is assumed that the spectral sensitivity characteristic $Q_k(\lambda)$ of the multispectral camera also is almost at the wavelength $\lambda i$. Here, when the spectral distribution of the light source unit 30 is $E(\lambda i)=0$ at the wavelength $\lambda i$, spectral data $R_k$ obtained by the multispectral camera does not include the spectral component at the wavelength $\lambda i$, so that the feature amount cannot be generated. Therefore, in a case where a wavelength suitable for generating the feature amount is known, illumination light having a spectral distribution at the wavelength is used. In addition, in a case where the wavelength suitable for generating the feature amount is unknown, illumination light having a spectral distribution over the entire wavelength band is used. For example, in a case where a feature amount for a skin area is generated, the feature amount based on, for example, a skin texture or a spot portion of skin with the blue component highly absorbed, clarified with white light, may be generated.

In step ST21, the information processing unit 20-5 acquires spectral data. The information processing unit 20-5 causes the light source unit 30 to emit light suitable for recognition processing, acquires spectral data generated by the multispectral camera 10 at this time, and the processing proceeds to step ST22.

Figure 11:
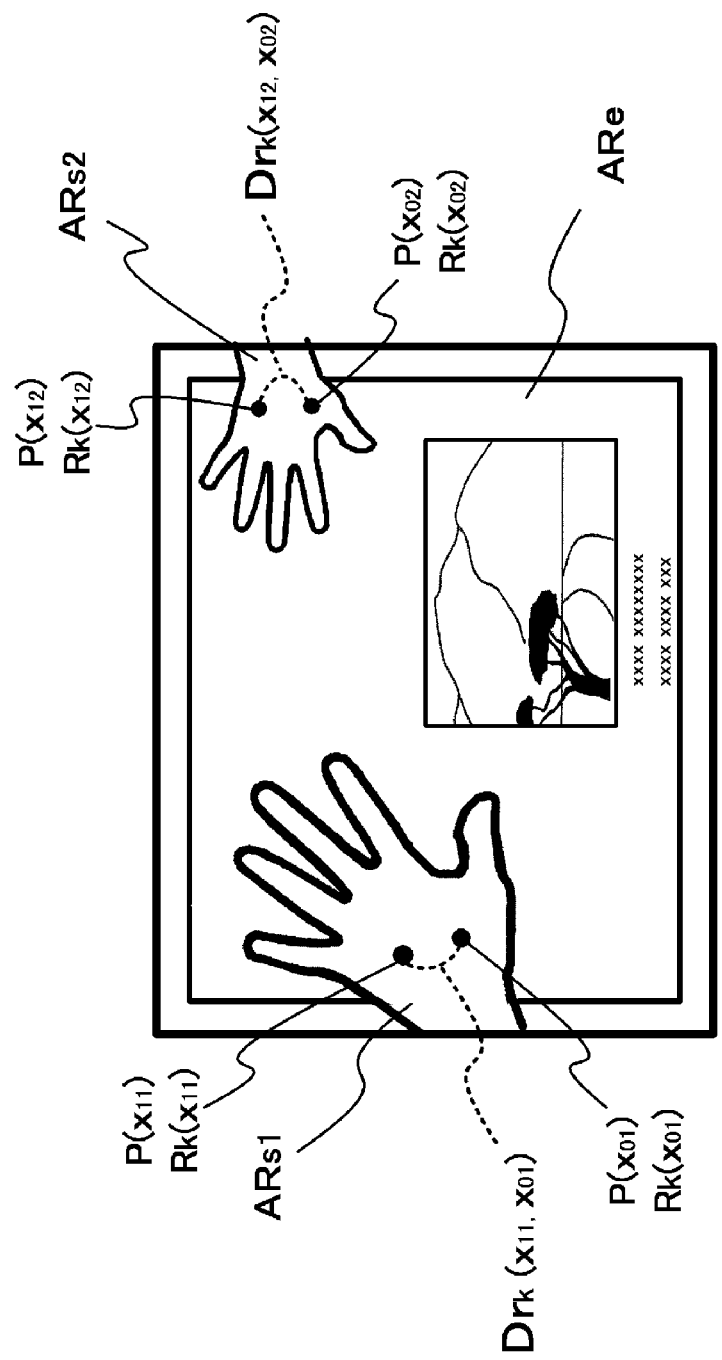
FIG. 11 illustrates an exemplary operation of the fifth embodiment.

In step ST22, the information processing unit detects a skin area. The information processing unit 20-5 discriminates whether each pixel is a pixel of a skin image on the basis of the spectral data, generates, for example, a skin area map indicating the result of the skin area detection, and the processing proceeds to step ST23. FIG. 11 illustrates an exemplary operation of the fifth embodiment. The skin area detection is performed on the basis of the spectral data generated by the multispectral camera 10, and areas ARs1, ARs2 are detected as skin areas, and an area ARe is detected as a non-skin area.

In step ST23, the information processing unit performs irradiation light control. The information processing unit 20-5 causes the light source to irradiate the areas ARs1, ARs2 with light suitable for recognition processing. In addition, the information processing unit 20-5 causes the light source to irradiate the area ARe with projection light indicating, for example, an image or text information. As described above, the information processing unit 20-5 controls the light to be emitted in accordance with the result of the skin area detection, and the processing proceeds to step ST24.

In step ST24, the information processing unit sets a base pixel. The information processing unit 20-5 sets, as the base pixel, one point in generation of a feature amount indicating the relationship in spectral reflectance between two points, for example, a fixed pixel area including one pixel or a plurality of pixels, and the processing proceeds to step ST25. Note that, in FIG. 11, a position $P(x_{01})$ is set as a base pixel in the area ARs1, and a position $P(x_{02})$ is set as a base pixel in the area ARs2.

In step ST25, the information processing unit generates a feature amount. The information processing unit 20-5 sets a reference pixel in a skin area where the base pixel is present, and, with spectral data of the reference pixel and spectral data of the base pixel that is set in step ST24, generates the feature amount indicating the relationship in spectral reflectance between the base pixel and the reference pixel. The processing then proceeds to step ST26.

For example, on the basis of Expressions (4), (5) described above, a feature amount $Dr_k(x_{11}, x_{01})$ is generated with spectral data $R_k(x_{01})$ of the base pixel at the position $P(x_{01})$ and spectral data $R_k(x_{11})$ of the reference pixel at the position $P(x_{11})$ set in the area ARs1 in FIG. 11. In addition, on the basis of Expressions (4), (5) described above, a feature amount $Dr_k(x_{12}, x_{02})$ is generated with spectral data $R_k(x_{02})$ of the base pixel at the position $P(x_{02})$ and spectral data $R_k(x_{12})$ of the reference pixel at the position $P(x_{12})$ set in set in the area ARs2.

In step ST26, the information processing unit performs recognition processing. The information processing unit 20-5 compares authentication information based on the feature amount generated in step ST25 with registration authentication information stored in advance, and performs recognition of a subject indicated by the spectral data, on a pixel basis or on an area basis. In addition, the information processing unit 20-5 outputs subject information correlated with registration authentication information that matches the authentication information based on the feature amount or has the minimum deviation, within a threshold, from the authentication information based on the feature amount, or outputs correlation of subject information and a captured image as the recognition result.

Furthermore, in the operation described above, the case where each skin area is irradiated with light having a wavelength suitable for the recognition processing has been described. However, in a case where recognition processing is performed on an object similarly to the third embodiment, it is sufficient if the object to be recognized is irradiated with light having a wavelength suitable for the recognition processing. For example, when a plant photosynthesizes actively, the spectral reflectance in the red visible region (around 650 to 660 nm) is considerably lower than the spectral reflectance in the near infrared region (around 750 to 800 nm). Thus, it is known that the activity of a plant is discriminated with a normalized difference vegetation index (NDVI) indicating a relative relationship between the spectral reflectance in the red visible region and the spectral reflectance in the near infrared region. Therefore, in a case where an object is a plant, light including wavelength components in the red visible region and the near infrared region is used as light having a wavelength suitable for the recognition processing. In addition, it is known that the reflectance in the red visible region tends to increase and the reflectance in the near infrared region tends to decrease as the freshness of a plant deteriorates. Thus, use of spectral data obtained by emitting the light including the wavelength components in the red visible region and the near infrared region enables accurate recognition of the freshness of a plant.

According to the fifth embodiment such as described above, an area to be used for recognition processing is irradiated with light suitable for the recognition processing, so that the recognition processing can be performed more accurately than the embodiments described above. In addition, various types of information can be projected onto an area having no relation to the recognition processing.

6. Modifications

The information processing unit is not limited to the configurations and operations of the embodiments described above, and may have a configuration or perform operation with a combination of the embodiments described above. For example, the second embodiment may be combined with the fifth embodiment such that recognition processing on a stationary skin area can be performed accurately while information is projected onto a non-skin area.

Figure 12:
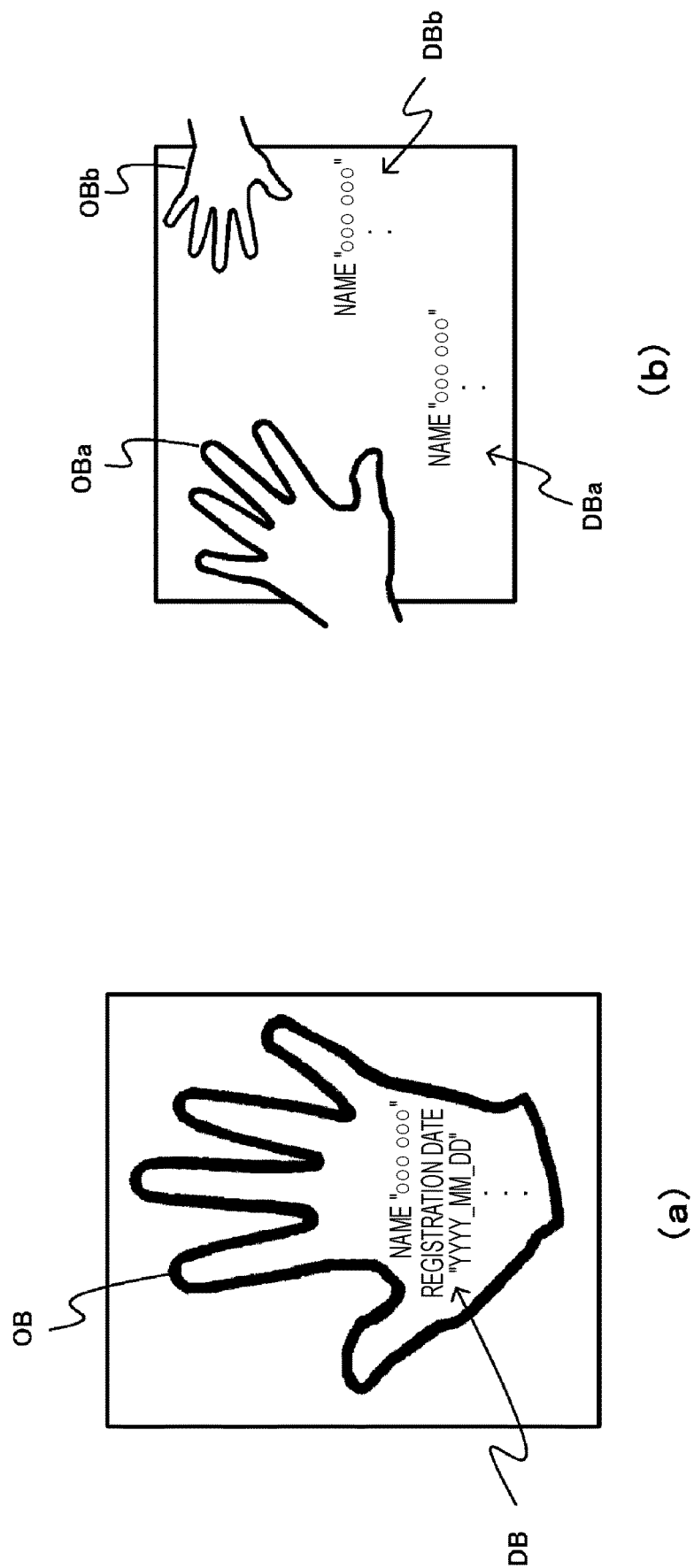
FIG. 12 exemplarily illustrates output of the results of processing.

In addition, the result of processing at the information processing unit may be displayed at or near the position of a subject that is the recognition target. FIG. 12 exemplarily illustrates output of the results of the processing. A recognition processing unit 27 superimposes subject information correlated with registration authentication information that matches authentication information based on a feature amount generated at a feature amount generation unit 26a (26b) on spectral data, and outputs the superimposed spectral data, for example. (a) of FIG. 12 exemplifies an output image in a case where subject information is superimposed on spectral data, and subject information DB is displayed at or near the position of a subject OB that is the recognition target. In addition, in a case where an information processing apparatus includes a light irradiation control unit, the result of recognition processing is output from a recognition processing unit to the light irradiation control unit, and the light irradiation control unit uses irradiation light to be emitted to an area different from a subject area to project subject information indicated by the result of authentication processing. (b) of FIG. 12 exemplifies a case where subject information is projected. The light irradiation control unit uses irradiation light different from irradiation light to a subject OBa to project subject information DBa near the subject OBa. In addition, the light irradiation control unit uses irradiation light different from irradiation light to a subject OBb to project subject information DBb near the subject OBb. As described above, displaying the result of the processing at the information processing unit at or near the position of the subject that is the recognition target enables facilitation of grasping recognition status for each subject.

The series of processing described in the specification can be executed by hardware or software, or the combination thereof. When the processing is executed by software, a program recorded the processing sequence is installed in a memory in a computer incorporated in dedicated hardware to cause the computer to execute the processing. Alternatively, the program can be installed in a general-purpose computer executable of various types of processing to cause the computer to execute the processing.

For example, the program can be recorded in advance in a hard disk, a solid state drive (SSD), or a read only memory (ROM), as a recording medium. Alternatively, the program can be transitorily or permanently stored (recorded) in a removable recording medium such as a flexible disk, a compact disc read only memory (CD-ROM), a magneto optical (MO) disc, a digital versatile disc (DVD), a Blu-ray Disc (registered trademark) (BD), a magnetic disk, or a semiconductor memory card. Such a removable recording medium can be provided as so-called package software.

Furthermore, in addition to installation of the program from a removable recording medium into the computer, the program may be transferred wirelessly or wiredly from a download site to the computer through a network such as local area network (LAN) or the Internet. In the computer, the program transferred in such a manner can be received and installed in a recording medium such as a built-in hard disk.

Note that the effects described in the present specification are merely exemplified and are not intended to be limiting, and additional effects that are not described herein may be made. In addition, the present technology should not be construed as being limited to the embodiments of the technology described above. The embodiments of this technology disclose the present technology in the form of exemplification, and it is obvious that corrections and substitutions of the embodiments can be made by those skilled in the art without departing from the gist of the present technology. That is, in order to decide the gist of the present technology, claims should be taken into consideration.

Furthermore, the feature amount generation device of the present technology can also have the following configurations.

(1) A feature amount generation device including: a feature amount generation unit configured to generate, from spectral data of a multispectral image, a feature amount indicating a relationship in spectral reflectance between two points in an irradiation region of a common light source.

(2) The feature amount generation device according to (1) described above, in which the irradiation region of the common light source is an area in which a spectral distribution of irradiation light is uniform.

(3) The feature amount generation device according to (1) or (2) described above, in which at least one of the two points is a position in an image area of a subject that is a target for generating the feature amount.

(4) The feature amount generation device according to any of (1) to (3) described above, in which the two points are different positions identical in time.

(5) The feature amount generation device according to (4) described above, in which when at least one of the two points is a point on a dynamic subject, the feature amount generation unit generates the feature amount, with the two points regarded as different positions identical in time.

(6) The feature amount generation device according to (4) described above, in which when both of the two points are points on a stationary subject, the feature amount, generation unit generates the feature amount, with the two points further regarded as identical positions different in time.

(7) The feature amount generation device according to any of (1) to (6) described above, in which a log-difference geometric mean chromaticity (LDGMC) value is generated as the feature amount indicating the relationship in spectral reflectance between the two points.

Moreover, the information processing apparatus of the present technology can also have the following configurations.

(1) An information processing apparatus including:
a feature amount generation unit configured to generate, from spectral data of a multispectral image, a feature amount indicating a relationship in spectral reflectance between two points in an irradiation region of a common light source; and
a recognition processing unit configured to perform, with at least one of the two points regarded as a position in an image area of a subject that is a recognition target in the multispectral image, recognition processing on the subject, on the basis of the feature amount generated at the feature amount generation unit.

(2) The information processing apparatus according to (1) described above, further including:
a dynamic area detection unit configured to detect a dynamic area, with the spectral data, in which the feature amount generation unit generates the feature amount indicating the relationship in spectral reflectance between the two points that are positions based on a result of the detection at the dynamic area detection unit.

(3) The information processing apparatus according to (2) described above, in which when the feature amount generation unit discriminates that the subject has been moved, on the basis of the result of the detection at the dynamic area detection unit, the feature amount generation unit generates the feature amount, with the two points regarded as different positions in the image area of the subject identical in time.

(4) The information processing apparatus according to (3) described above, in which when the feature amount generation unit discriminates that the subject has not been moved, the feature amount generation unit generates the feature amount, with the two points further regarded as identical positions in the image area different in time.

(5) The information processing apparatus according to any of (1) to (4) described above, further including:
an area detection unit configured to detect a subject area, with the spectral data; and
an irradiation light control unit configured to perform irradiation light control of the light source, in accordance with a result of the detection at the area detection unit.

(6) The information processing apparatus according to (5) described above, in which the irradiation light control unit causes the light source to irradiate, with irradiation light having a spectral distribution set in advance, the subject that is the recognition target detected at the area detection unit.

(7) The information processing apparatus according to any of (1) to (6) described above, in which the recognition processing unit performs collation between authentication information and registration authentication information registered in advance, the authentication information being obtained through machine learning performed with the feature amount for each band generated at the feature amount generation unit, and outputs a recognition result of the subject, on the basis of a result of the collation.

(8) The information processing apparatus according to any of (1) to (7) described above, in which the feature amount generation unit generates a log-difference geometric mean chromaticity (LDGMC) value as the feature amount indicating the relationship in spectral reflectance between the two points.

(9) The information processing apparatus according to any of (1) to (8) described above, in which the multispectral image is a captured image including a skin area.

(10) The information processing apparatus according to (9) described above, in which the two points are points in the skin area.

(11) The information processing apparatus according to (9) described above, in which one of the two points is a point in the skin area, and another of the two points is a point in a non-skin area different from the skin area.

INDUSTRIAL APPLICABILITY

In the feature amount generation device and the feature amount generating method, and information processing apparatus and information processing method of this technology, the feature amount indicating the relationship in spectral reflectance between the two points in the irradiation region of the common light source is generated from the spectral data of the multispectral image. In addition, the recognition processing on the subject is performed with the generated feature amount. Therefore, without acquisition of light source information, the feature amount robust against variation of the light source and appropriate for the subject can be generated easily. Furthermore, performing the recognition processing with the generated feature amount enables the accurate recognition processing even if the light source varies between registration of the subject and the recognition of the subject. Therefore, it is suitable for a person authentication system, a monitoring system, selection of a desired object, and the like.

REFERENCE SIGNS LIST

10 Multispectral camera
20-1, 20-2, 20-3, 20-5 Information processing unit

21 Skin area detection unit
22 Object area detection unit
23 Base pixel setting unit
24 Dynamic area detection unit
25 Past image storage unit
26a, 26b Feature amount generation unit
27 Recognition processing unit
28 Information storage unit
29 Light irradiation control unit
30 Light source unit

The invention claimed is:

1. A feature amount generation device comprising:
a feature amount generation unit configured to generate, from spectral data of a multispectral image, a feature amount indicating a relationship in spectral reflectance between two points in an irradiation region of a common light source,
wherein when at least one of the two points is a point on a dynamic subject, the feature amount generation unit generates the feature amount, with the two points regarded as different positions identical in time, and
wherein the feature amount generation unit is implemented via at least one processor.

2. The feature amount generation device according to claim 1,
wherein the irradiation region of the common light source is an area in which a spectral distribution of irradiation light is uniform.

3. The feature amount generation device according to claim 1,
wherein at least one of the two points is a position in an image area of a subject that is a target for generating the feature amount.

4. The feature amount generation device according to claim 1,
wherein when both of the two points are points on a stationary subject, the feature amount generation unit generates the feature amount, with the two points further regarded as identical positions different in time.

5. A feature amount generation device comprising:
a feature amount generation unit configured to generate, from spectral data of a multispectral image, a feature amount indicating a relationship in spectral reflectance between two points in an irradiation region of a common light source,
wherein a log-difference geometric mean chromaticity (LDGMC) value is generated as the feature amount indicating the relationship in spectral reflectance between the two points, and
wherein the feature amount generation unit is implemented via at least one processor.

6. A feature amount generating method comprising:
generating, from spectral data of a multispectral image, a feature amount indicating a relationship in spectral reflectance between two points in an irradiation region of a common light source,
wherein when at least one of the two points is a point on a dynamic subject, the feature amount is generated with the two points regarded as different positions identical in time.

7. An information processing apparatus comprising:
a feature amount generation unit configured to generate, from spectral data of a multispectral image, a feature amount indicating a relationship in spectral reflectance between two points in an irradiation region of a common light source;
a recognition processing unit configured to perform, with at least one of the two points regarded as a position in an image area of a subject that is a recognition target in the multispectral image, recognition processing on the subject, on a basis of the feature amount generated at the feature amount generation unit, and
a dynamic area detection unit configured to detect a dynamic area, with the spectral data,
wherein the feature amount generation unit generates the feature amount indicating the relationship in spectral reflectance between the two points that are positions based on a result of the detection at the dynamic area detection unit, and
wherein the feature amount generation unit, the recognition processing unit, and the dynamic area detection unit are each implemented via at least one processor.

8. The information processing apparatus according to claim 7,
wherein when the feature amount generation unit discriminates that the subject has been moved, on a basis of the result of the detection at the dynamic area detection unit, the feature amount generation unit generates the feature amount, with the two points regarded as different positions in the image area of the subject identical in time.

9. The information processing apparatus according to claim 8,
wherein when the feature amount generation unit discriminates that the subject has not been moved, the feature amount generation unit generates the feature amount, with the two points further regarded as identical positions in the image area different in time.

10. An information processing apparatus comprising:
a feature amount generation unit configured to generate, from spectral data of a multispectral image, a feature amount indicating a relationship in spectral reflectance between two points in an irradiation region of a common light source;
a recognition processing unit configured to perform, with at least one of the two points regarded as a position in an image area of a subject that is a recognition target in the multispectral image, recognition processing on the subject, on a basis of the feature amount generated at the feature amount generation unit;
an area detection unit configured to detect a subject area, with the spectral data; and
an irradiation light control unit configured to perform irradiation light control of the light source, in accordance with a result of the detection at the area detection unit,
wherein the feature amount generation unit, the recognition processing unit, the area detection unit, and the irradiation light control unit are each implemented via at least one processor.

11. The information processing apparatus according to claim 10,
wherein the irradiation light control unit causes the light source to irradiate, with irradiation light having a spectral distribution set in advance, the subject that is the recognition target detected at the area detection unit.

12. An information processing apparatus comprising:
a feature amount generation unit configured to generate, from spectral data of a multispectral image, a feature amount indicating a relationship in spectral reflectance between two points in an irradiation region of a common light source; and a recognition processing unit configured to perform, with at least one of the two points regarded as a position in an image area of a subject that is a recognition target in the multispectral image, recognition processing on the subject, on a basis of the feature amount generated at the feature amount generation unit, wherein the recognition processing unit performs collation between authentication information and registration authentication information registered in advance, the authentication information being obtained through machine learning performed with the feature amount for each band generated at the feature amount generation unit, and outputs a recognition result of the subject, on a basis of a result of the collation, and wherein the feature amount generation unit and the recognition processing unit are each implemented via at least one processor.

13. An information processing apparatus comprising:

a feature amount generation unit configured to generate, from spectral data of a multispectral image, a feature amount indicating a relationship in spectral reflectance between two points in an irradiation region of a common light source; and a recognition processing unit configured to perform, with at least one of the two points regarded as a position in an image area of a subject that is a recognition target in the multispectral image, recognition processing on the subject, on a basis of the feature amount generated at the feature amount generation unit, wherein the feature amount generation unit generates a log-difference geometric mean chromaticity (LDGMC) value as the feature amount indicating the relationship in spectral reflectance between the two points, and wherein the feature amount generation unit and the recognition processing unit are each implemented via at least one processor.

14. An information processing apparatus comprising:

a feature amount generation unit configured to generate, from spectral data of a multispectral image, a feature amount indicating a relationship in spectral reflectance between two points in an irradiation region of a common light source; and a recognition processing unit configured to perform, with at least one of the two points regarded as a position in an image area of a subject that is a recognition target in the multispectral image, recognition processing on the subject, on a basis of the feature amount generated at the feature amount generation unit, wherein the multispectral image is a captured image including a skin area, wherein one of the two points is a point in the skin area, and another of the two points is a point in a non-skin area different from the skin area, and wherein the feature amount generation unit and the recognition processing unit are each implemented via at least one processor.

15. An information processing method comprising:

generating, from spectral data of a multispectral image, a feature amount indicating a relationship in spectral reflectance between two points in an irradiation region of a common light source;

performing, with at least one of the two points regarded as a position in an image area of a subject that is a recognition target in the multispectral image, recognition processing on the subject, on a basis of the generated feature amount; and detecting a dynamic area, with the spectral data, wherein the feature amount indicating the relationship in spectral reflectance between the two points that are positions is generated based on a result of the detection of the dynamic area.

* * * * *